US007140283B2

(12) United States Patent
Alsten et al.

(10) Patent No.: US 7,140,283 B2
(45) Date of Patent: Nov. 28, 2006

(54) AUTOMATED METHOD AND APPARATUS FOR VISION REGISTRATION OF GRAPHICS AREAS OPERATING FROM THE UNPRINTED SIDE

(75) Inventors: Peter Alsten, Racine, WI (US); Steen Mikkelsen, Delavan, WI (US); Geo Andersen, Aabyhoej (DK)

(73) Assignee: Mikkelsen Graphic Engineering, Lake Geneva, WI (US)

( * ) Notice: Subject to any disclaimer, the term of this patent is extended or adjusted under 35 U.S.C. 154(b) by 0 days.

(21) Appl. No.: 10/839,429

(22) Filed: May 5, 2004

(65) Prior Publication Data

US 2005/0247173 A1 Nov. 10, 2005

(51) Int. Cl.
*B26D 5/00* (2006.01)
*G05B 15/00* (2006.01)

(52) U.S. Cl. ........................ 83/13; 83/34; 83/39; 83/75; 83/76.8; 83/365; 83/368; 83/371; 700/134; 700/150; 700/167; 700/259; 347/157

(58) Field of Classification Search .................... 83/13, 83/22, 32, 34, 39, 49, 52, 56, 371, 747, 75.5, 83/72–75, 901, 76.9, 76.8, 368, 364–366, 83/936–941; 101/3.1, 17, 19, 26, 32, 73, 101/45, 483, 486; 700/134, 171, 114, 213, 700/167, 150, 230, 135, 259; 347/157, 111; 400/621; 382/111, 165
See application file for complete search history.

(56) References Cited

U.S. PATENT DOCUMENTS

| | | | |
|---|---|---|---|
| 3,242,573 | A | 3/1966 | Noel |
| 3,608,799 | A | 9/1971 | Edson |
| 3,803,960 | A | 4/1974 | Pearl et al. |
| 3,805,650 | A | 4/1974 | Pearl et al. |
| 3,848,490 | A | 11/1974 | Arel |
| 3,855,887 | A | 12/1974 | Pearl et al. |
| 3,864,997 | A | 2/1975 | Pearl et al. |
| 4,071,899 | A | 1/1978 | Holy |
| 4,083,095 | A | 4/1978 | Flaum et al. |
| 4,246,058 | A | 1/1981 | Reed |
| 4,273,606 | A | 6/1981 | Trilli |
| 4,282,056 | A | 8/1981 | Okui |
| 4,333,781 | A | 6/1982 | Meulenberg |
| 4,374,691 | A | 2/1983 | Vanden Bergh |
| 4,380,944 | A | 4/1983 | Gerber et al. |
| 4,419,913 | A | 12/1983 | Schutt et al. |
| 4,448,808 | A | 5/1984 | Pearl |
| 4,494,435 | A | 1/1985 | Lindsay |
| 4,555,968 | A | 12/1985 | Raney et al. |
| 4,583,181 | A | 4/1986 | Gerber et al. |

(Continued)

*Primary Examiner*—Stephen Choi
(74) *Attorney, Agent, or Firm*—Jansson, Shupe, Munger & Antaramian, Ltd.

(57) ABSTRACT

A method and apparatus are disclosed for performing finishing operations on at least one graphics area on a graphics sheet, the graphics sheet having a graphics side, an opposite process side, and reference features, the graphics side bearing the graphics area(s) and registration marks in predetermined positions with respect to the graphics area(s). The method comprises positioning the graphics sheet on a sheet-receiving surface, sensing from the graphics side the positions of the registration marks, determining the coordinates of the graphics area(s) with respect to the sheet-receiving surface as if viewable from the process side, and performing finishing operations on the process side of the graphics sheet based on such determination, whereby such process-side finishing operations compensate for variations of the graphics area(s).

23 Claims, 5 Drawing Sheets

U.S. PATENT DOCUMENTS

| | | | | |
|---|---|---|---|---|
| 4,645,555 | A | 2/1987 | Kuboyama | |
| 4,680,083 | A | 7/1987 | Kashiwaba | |
| 4,697,485 | A | 10/1987 | Raney | |
| 4,704,927 | A | 11/1987 | Hirosawa | |
| 4,721,058 | A | 1/1988 | Hayamizu et al. | |
| 4,768,410 | A | 9/1988 | Wood | |
| 4,786,537 | A | 11/1988 | Sasaki | |
| 4,827,140 | A | 5/1989 | Mohan | |
| 4,869,767 | A | 9/1989 | Robinson et al. | |
| 4,882,961 | A | 11/1989 | Zabinski et al. | |
| 4,901,359 | A | 2/1990 | Bruder | |
| 4,933,124 | A | 6/1990 | Duncan | |
| 4,941,183 | A | 7/1990 | Bruder et al. | |
| 5,026,584 | A | 6/1991 | Logan | |
| 5,074,178 | A | 12/1991 | Shetley et al. | |
| 5,082,822 | A | 1/1992 | Uytterhoeven et al. | |
| 5,112,423 | A | 5/1992 | Liebe, Jr. | |
| 5,143,576 | A | 9/1992 | Logan | |
| 5,201,351 | A | 4/1993 | Hurdle, Jr. | |
| 5,212,647 | A | 5/1993 | Raney et al. | |
| 5,258,917 | A | 11/1993 | Bruder et al. | |
| 5,277,736 | A | 1/1994 | Logan | |
| 5,288,358 | A | 2/1994 | Logan | |
| 5,333,111 | A | 7/1994 | Chaiken et al. | |
| 5,344,680 | A | 9/1994 | Logan et al. | |
| 5,466,501 | A | 11/1995 | Logan et al. | |
| 5,537,135 | A | 7/1996 | Hevenor et al. | |
| 5,551,786 | A | 9/1996 | Webster et al. | |
| 5,644,979 | A | 7/1997 | Raney | |
| 5,695,600 | A | 12/1997 | Goin | |
| 5,727,433 | A | 3/1998 | Pomerleau et al. | |
| 5,794,526 | A | 8/1998 | Raney | |
| 5,838,569 | A | 11/1998 | Gane | |
| 5,937,725 | A | 8/1999 | Kamijo et al. | |
| 6,102,097 | A | 8/2000 | Stempien | |
| 6,106,645 | A | 8/2000 | Stempien | |
| 6,112,630 | A | 9/2000 | Miura | |
| 6,192,777 | B1 | 2/2001 | Williams et al. | |
| 6,205,370 | B1 | 3/2001 | Blaimschein et al. | |
| 6,358,358 | B1 | 3/2002 | Bilisoly | |
| 6,619,167 | B1 * | 9/2003 | Mikkelsen et al. | 83/13 |
| 6,619,168 | B1 * | 9/2003 | Alsten et al. | 83/13 |
| 6,672,187 | B1 * | 1/2004 | Alsten et al. | 83/13 |
| 6,772,661 | B1 * | 8/2004 | Mikkelsen et al. | 83/13 |
| 6,797,103 | B1 * | 9/2004 | Mikkelsen et al. | 156/247 |
| 2004/0083862 | A1 | 5/2004 | Mikkelsen et al. | |
| 2005/0166744 | A1 | 8/2005 | Berge et al. | |

* cited by examiner

AUTOMATED METHOD AND APPARATUS FOR VISION REGISTRATION OF GRAPHICS AREAS OPERATING FROM THE UNPRINTED SIDE

FIELD OF THE INVENTION

This invention is related generally to the field of finish-processing of graphics areas or the like from sheets for various purposes such as the production of box packaging on which graphics have been printed.

BACKGROUND OF THE INVENTION

As the technology for printing develops and the quality of printed materials continues to improve, the need for more accurate and flexible finishing operations on printed material such as box packaging, point-of-purchase displays, or other such products has increased. Finishing operations include such processes as creasing (creating a fold line) and cutting.

Creasing, typically carried out using a creasing wheel or creasing shoe made of steel, must be done from the side opposite to the printed side of a sheet in order to avoid damaging the printed media and to create a fold which will both hold better when the product, such as a box, is formed, and give the final product a higher quality appearance.

Finish cutting of thicker printed sheet material is another example of a finishing operation which is preferably done from the side of the sheet opposite to that on which graphics have been printed. Such cutting is typically carried out using long oscillating blades. When cutting is done from the printed side, cut lines often cross to some extent, degrading appearance and resulting in a lower quality final product. These cut crossings usually occur at inside corners or corners with small radii. By cutting from the side opposite to the printed side, these small imperfections are concealed, thus improving the quality of the final product.

In order to produce such high quality results, it is necessary that such finishing operations operate with high-accuracy registration between the graphics on the printed side (herein called the graphics side) and the folds or cuts produced by the finishing operation carried out from the opposite side (herein called the process side).

Such finishing operations are often done using tools attached to the head of a flatbed X-Y plotter. Methods and associated apparatus which are able to achieve high-accuracy control during the processing of sheet material are part of the i-cut™ vision cutting system from Mikkelsen Graphic Engineering of Lake Geneva, Wis., USA, and is the subject of U.S. patent application Ser. No. 09/678,594, filed on Oct. 4, 2000, Ser. No. 10/283,460, filed on Oct. 30, 2002, and U.S. Pat. Nos. 6,619,167, 6,619,168, and 6,672,187. All of these documents disclose methods and/or apparatus which address high-accuracy processing of graphics sheet material more broadly defined as "narrow-path processing."

The invention described in Ser. No. 09/678,594 is a method and apparatus for achieving highly improved accuracy in cutting around graphics areas in order to fully adjust for distortion in the sheets from which the graphics areas will be cut, including distortion of differing degrees in different directions on the sheet of material. The distortion may be from the printing process or from some other post-printing process such as material handling or during the cutting process itself. This invention also provides improved speed and accuracy in narrow-path-processing and greater efficiency of material usage.

The invention disclosed in U.S. Pat. No. 6,619,167 is a method and apparatus for automatically and rapidly determining the position and orientation of a sheet of material on a work surface. When the placement of the sheet of material is not precisely controlled, the speed of the cutting or other narrow-path-processing system is often impaired because the system may require manual intervention to adjust the placement of the sheet of material so that the system can begin processing. Thus, the invention described in such patent disclosure provides further improved speed over the invention described in the first-mentioned patent disclosure.

The invention disclosed in U.S. Pat. No. 6,619,168 is a method and apparatus which further improves the speed and efficiency of narrow-path-processing by automatically correcting for careless initial manual placement or malfunctioning automatic placement of a sheet of material on a work surface. The invention automatically and rapidly finds a set of special marks used for determination of the position and orientation of the sheet of material, eliminating the need for yet another possible manual intervention step.

The invention disclosed in U.S. Pat. No. 6,672,187 extends the capability of the Mikkelsen Graphic Engineering's i-cut™ vision cutting system, enabling the position and orientation of the sheet of material to be determined without the use of special marks.

Prior to the invention described herein, any attempt to perform finishing operations, such as the cutting and creasing operations described above, from the process side would have required determining the position and orientation of the sheet only from the sensing of the corners or edges of the graphics sheets from the process side of the sheet. Such an approach would not be able to compensate for variations in print registration or distortion of the sheet material and would provide no control of the process to prevent applying the wrong set of finishing operation instructions to a sheet of material.

One approach which has achieved limited success has been to drill holes through the sheet of material from the graphics side based on the positions of registration marks and then to finish-process the sheet from the process side based on the position of these holes. This method is both costly and inefficient.

Thus there is a need for a highly accurate, fast, and flexible method, apparatus, and system for finish-processing of graphics sheets from the side opposite to the printed side of the sheet.

OBJECTS OF THE INVENTION

It is an object of this invention to provide a method and apparatus for automatically performing finishing operations on a graphics sheet such as cutting and creasing from the side opposite to that on which at least one graphics area is printed, overcoming some of the problems and shortcomings of the prior art.

Another object of this invention is to provide a method and apparatus which increases the accuracy of finishing operations performed from the process side of graphics sheets.

Another object of this invention is to provide a method and apparatus which increases the speed of finishing operations performed from the process side of graphics sheets.

Another object of this invention is to provide a method and apparatus which reduces the amount of manual intervention during the finishing operations performed from the process side of graphics sheets.

Another object of this invention is to eliminate errors associated with the finishing operations of graphics sheets performed for the process side, such as having the sheet in the wrong orientation or using the wrong finishing instructions for the graphics sheet loaded in the apparatus.

Another object of this invention is to reduce the waste associated with performing finishing operations from the process side of graphics sheets.

Still another object of this invention is to improve the quality and appearance of graphics products on which finishing operations are performed from the process side of graphics sheets.

Yet another object of this invention is to reduce the set-up time required for finishing operations performed from the process side of graphics sheets.

These and other objects of the invention will be apparent from the following descriptions and from the drawings.

SUMMARY OF THE INVENTION

The instant invention overcomes the above-noted problems and shortcomings and satisfies the objects of the invention. The invention is a method and apparatus for automatically performing finishing operations on a graphics sheet such as cutting and creasing from the side opposite to that on which at least one graphics area is printed.

A "graphics sheet" as referred to herein is a sheet of material on which one or more graphics areas have been printed. A graphics sheet is described as having a "graphics side", the side of the sheet on which one or more graphics areas have been printed, and a "process side", the side opposite the graphics side and from which the finishing operations are done, such as cutting or creasing (creating fold lines).

As used herein, the term "reference feature," used to describe certain characteristics of a graphics sheet, refers to features of a graphics sheet which can be viewed from both sides of the graphics sheet, mainly corners and edges.

As used herein, the term "metrics," applied in characterizing a reference feature, refers to the numerical parameters which can be used by the device to describe the position and orientation of the reference feature and, in combination with other metrics of this and other reference features, can be used to infer the position and orientation of the sheet of material on the sheet-receiving surface. For example, a straight edge of a sheet of material defines a line which lies at an angle with respect to the coordinate system axes of the sheet-receiving surface. Such angle is one such "metric." The corner of a sheet defined by the intersection of two such edges defines a point within the coordinate system, and the x,y coordinates of the corner point are two more such "metrics." These "metrics" can then be used to determine the relative position of registration marks printed on the graphics-side of the graphics sheet with respect the reference marks (e.g., corners of the graphics sheet).

As used herein, the term "properly loaded" describes the condition that a graphics sheet corresponding to a set of finishing operation instructions is positioned within the apparatus for performing finishing operations on the graphics sheet such that the correct operation can be carried out. The term "properly loaded" may or may not include sheets which have been rotated 180 degrees from the orientation expected by the finishing operation instructions. If appropriate finishing operation instructions for the graphics sheet are not available to the apparatus then the sheet is not "properly loaded."

As used herein, the term "adjacent" when referring to registration marks adjacent to reference features means that both the registration marks and the reference features are within a single field-of-view of the sensor.

The terms "linear" and "non-linear" are used herein to describe the distortions that can occur in graphics areas which are printed on graphics sheets. "Linear" distortion describes variations in the location of the elements of a graphics area which are directly proportional to the distance from some fixed point in a coordinate system. Thus, for example, if a graphics sheet has become uniformly stretched along one dimension of the graphics sheet, then the distortion of the graphics area along that direction is proportional to the distance along that direction from, say, the edge of the graphics sheet. If, on the other hand, the stretching along this direction is not uniform but the degree of stretching varies along such direction, the distortion is described as being "non-linear."

In certain embodiments, the invention is a method for performing finishing operations on at least one graphics area on a graphics sheet, the graphics sheet having a graphics side, an opposite process side, and reference features, the graphics side bearing the graphics area(s) and registration marks in predetermined positions with respect to the graphics area(s). The method comprises positioning the graphics sheet on a sheet-receiving surface; sensing from the graphics side the positions of the registration marks; determining the coordinates of the graphics area(s) with respect to the sheet-receiving surface as if viewable from the process side; and performing finishing operations on the process side of the graphics sheet based on such determination. Such a method allows the process-side finishing operations to compensate for variations of the graphics area(s) such as variations including print registration errors, linear distortions, or non-linear distortions.

In some embodiments of this method, the graphics sheet is positioned with the graphics side facing the sheet-receiving surface throughout the sensing, determining, and performing actions. In such embodiments, it is preferred that a portion of the sheet-receiving surface be transparent and the positions of the registration marks be sensed through the transparent portion.

In other embodiments, the method may include sensing from the graphics side the metrics of the reference features of the sheet. In these embodiments, it is preferred that the graphics sheet be positioned on the sheet-receiving surface after the registration marks and metrics are sensed from the graphics side. After the graphics sheet is positioned on the sheet-receiving surface, the metrics of the reference features are sensed from the process side and the relative positions of the registration marks to the reference features are used to determine the coordinates of the graphics area(s) with respect to the sheet-receiving surface.

In certain of these embodiments, the metrics of the reference features and the positions of the registration marks may be sensed from the graphics side by lifting and holding the graphics sheet. Of course, in such embodiments, the graphics sheet is positioned on the sheet-receiving surface after the metrics of the reference features and the positions of the registration marks are sensed from the graphics side. In certain of these embodiments, the metrics of the reference features and the positions of the registration marks are sensed from the graphics side during translation of the graphics sheet in a plane parallel to the plane of the graphics sheet. In certain of these embodiments, the metrics of the reference features and the positions of the registration marks are sensed from the graphics side by translating a sensor in a plane parallel to the plane of the graphics sheet.

The sensing of the positions of the registration marks from the graphics side may include sensing the positions of the registration marks not adjacent to the reference features. The sensing of the metrics of the reference features from the graphics side may include sensing the positions of at least two corners of the graphics sheet. The sensing of the positions of the registration marks from the graphics side may include sensing the position(s) of at least one registration mark adjacent to each of the at least two corners of the graphics sheet. The sensing from the process side of the metrics of the reference features may include sensing the positions of the at least two corners of the graphics sheet.

In certain embodiments, the method further comprises automatically identifying the graphics sheet; and selecting finishing operation instructions associated with the identified graphics sheet. Such embodiments enable graphics sheets printed with differing graphics areas to be automatically finished sequentially. The automatic identifying action may include reading a bar code on the graphics side of the graphics sheet.

In certain embodiments, the method further comprises determining whether the graphics sheet has been properly loaded to correspond to a set of finishing operation instructions and, if not, preventing the finishing operation from occurring.

A preferred embodiment of the present invention is a method for performing finishing operations on at least one graphics area on a graphics sheet having a graphics side and an opposite process side, the graphics side bearing a combination of such graphics area(s) and a plurality of registration marks in predetermined positions with respect to the graphics area(s). The method includes: sensing from the graphics side the metrics of the reference features of the sheet; sensing from the graphics side the positions of the registration marks; sensing from the process side the metrics of the reference features; determining the coordinates of the graphics area(s) as if viewable from the process side; and performing finishing operations on the process side of the graphics sheet based on such determination. Such process-side finishing operations compensate for variations of the graphics area(s) including variations due to both linear and non-linear distortions.

In certain preferred embodiments of the method of this invention, the steps of sensing the metrics of the reference features and the positions of the registration marks from the graphics side include lifting and holding the graphics sheet during the sensing steps.

In other preferred embodiments of the inventive method, the steps of sensing the metrics of the reference features and the positions of the registration marks from the graphics side include translating the graphics sheet in a plane parallel to the plane of the graphics sheet in order to sense the reference features and registration marks. In some embodiments, the sensing of the positions of the registration marks from the graphics side includes sensing the positions of the registration marks not adjacent to the reference features.

In other preferred embodiments, sensing the metrics of the reference features and the positions of the registration marks from the graphics side include translating a sensor in a plane parallel to the plane of the graphics sheet in order to sense the reference features and the registration marks. In certain embodiments, the sensing of the positions of the registration marks from the graphics side includes sensing the positions of the registration marks not adjacent to the reference features.

In certain other embodiments of the inventive method, the sensing of the metrics of the reference features from the graphics side includes sensing the positions of at least two corners of the graphics sheet. In some embodiments, the sensing of the positions of the registration marks from the graphics side includes sensing the position(s) of at least one registration mark adjacent to each of the at least two corners of the graphics sheet. Further, in some embodiments, the sensing from the process side of the metrics of the reference features includes sensing the positions of the at least two corners of the graphics sheet.

Highly preferred embodiments of the inventive method include automatically identifying the graphics sheet and selecting finishing operation instructions associated with the identified graphics sheet, thereby enabling graphics sheets printed with differing graphics areas to be automatically finished sequentially.

In certain embodiments, the automatic identifying step includes reading a bar code on the graphics side of the graphics sheet.

In another preferred embodiment, the method includes determining whether the graphics sheet has been properly loaded to correspond to a set of finishing operation instructions and, if not, preventing the finishing operation from occurring.

In another embodiment of the method in which finishing operations are performed on at least one graphics area on a graphics sheet having a graphics side and an opposite process side, the graphics side bearing a combination of such graphics area(s) and a plurality of registration marks in predetermined positions with respect to the graphics area(s), the method includes: sensing from the graphics side the metrics of the reference features of the sheet; sensing from the graphics side the positions of the registration marks; determining the coordinates of the graphics area(s) as if viewable from the process side; and performing finishing operations on the process side of the graphics sheet based on such determination. As in other embodiments of the inventive method, such process-side finishing operations compensate for variations of the graphics area(s) including variations due to linear distortions, non-linear distortions, or both linear and non-linear distortions.

The invention may also be described as an apparatus for performing finishing operations on at least one graphics area on a graphics sheet, the graphics sheet having a graphics side, an opposite process side, and reference features, the graphics side bearing the graphics area(s) and registration marks in predetermined positions with respect to the graphics area(s). In certain embodiments, such an apparatus comprises a sheet-receiving surface; a graphics-side sensor for sensing from the graphics side the positions of the registration marks; and a controller for determining the coordinates of the graphics area(s) with respect to the sheet-receiving surface as if viewable from the process side and for controlling finishing operations on the process side of the graphics sheet based on such determination. Such process-side finishing operations compensate for variations of the graphics area(s), including print registration errors, linear distortions, or non-linear distortions.

In certain embodiments, at least a portion of the sheet receiving surface is transparent and the graphics-side sensor senses the positions of the registration marks through the transparent portion.

In certain embodiments, the graphics-side sensor senses from the graphics side the metrics of the reference features of the sheet and the apparatus further comprises a process-side sensor to sense the metrics of the reference features from the process side.

The graphics-side sensor set may include at least one camera. The graphics-side sensor set may include a camera actuator to translate at least one such camera in a plane parallel to the plane of the graphics sheet during the sensing from the graphics side. The apparatus may include a sheet actuator to translate the graphics sheet in a plane parallel to the plane of the graphics sheet during sensing from the graphics side. The apparatus may include lifting and holding apparatus to lift and hold the graphics sheet during the sensing from the graphics side.

Another embodiment of the present invention is an apparatus for performing finishing operations on at least one graphics area on a graphics sheet having a graphics side and an opposite process side, the graphics side bearing a combination of such graphics area(s) and a plurality of registration marks in predetermined positions with respect to the graphics area(s). The apparatus comprises: a sheet-receiving surface; a graphics-side sensor set to sense the metrics of the reference features of the sheet and to sense the positions of the registration marks, all from the graphics side; a process-side sensor to sense the metrics of the reference features from the process side; a controller for determining the coordinates of the graphics area(s) as if viewable from the process side and for controlling finishing operations on the process side of the graphics sheet based on such determination. The apparatus enables the process-side finishing operations to compensate for variations of the graphics area(s) including variations due to linear distortions, non-linear distortions, or both linear and non-linear distortions.

In certain preferred embodiments of the apparatus, the graphics-side sensor set includes at least one camera. In some embodiments, the graphics-side sensor set includes a camera actuator to translate at least one camera in a plane parallel to the plane of the graphics sheet during the sensing from the graphics side.

In other preferred embodiments of the apparatus, the apparatus further includes a sheet actuator to translate the graphics sheet in a plane parallel to the plane of the graphics sheet during sensing from the graphics side.

Some highly preferred embodiments of the inventive apparatus include lifting and holding apparatus to lift and hold the graphics sheet during the sensing from the graphics side.

In another embodiment of the apparatus for performing finishing operations on at least one graphics area on a graphics sheet having a graphics side and an opposite process side, the graphics side bearing a combination of such graphics area(s) and a plurality of registration marks in predetermined positions with respect to the graphics area(s), the apparatus comprises: a sheet-receiving surface, at least a portion of which is transparent; a graphics-side sensor set to sense from the graphics side the metrics of the reference features of the sheet and the positions of the registration marks through the transparent portion of the sheet-receiving surface; a controller for determining the coordinates of the graphics area(s) as if viewable from the process side and for controlling finishing operations on the process side of the graphics sheet based on such determination. Such process-side finishing operations compensate for variations of the graphics area(s) including variations due to both linear and non-linear distortions. In some of these embodiments, the graphics-side sensor set includes at least one fixed camera. In other of these embodiments, the graphics-side sensor set includes a translatable camera.

DETAILED DESCRIPTION OF PREFERRED EMBODIMENTS

Figure 1:
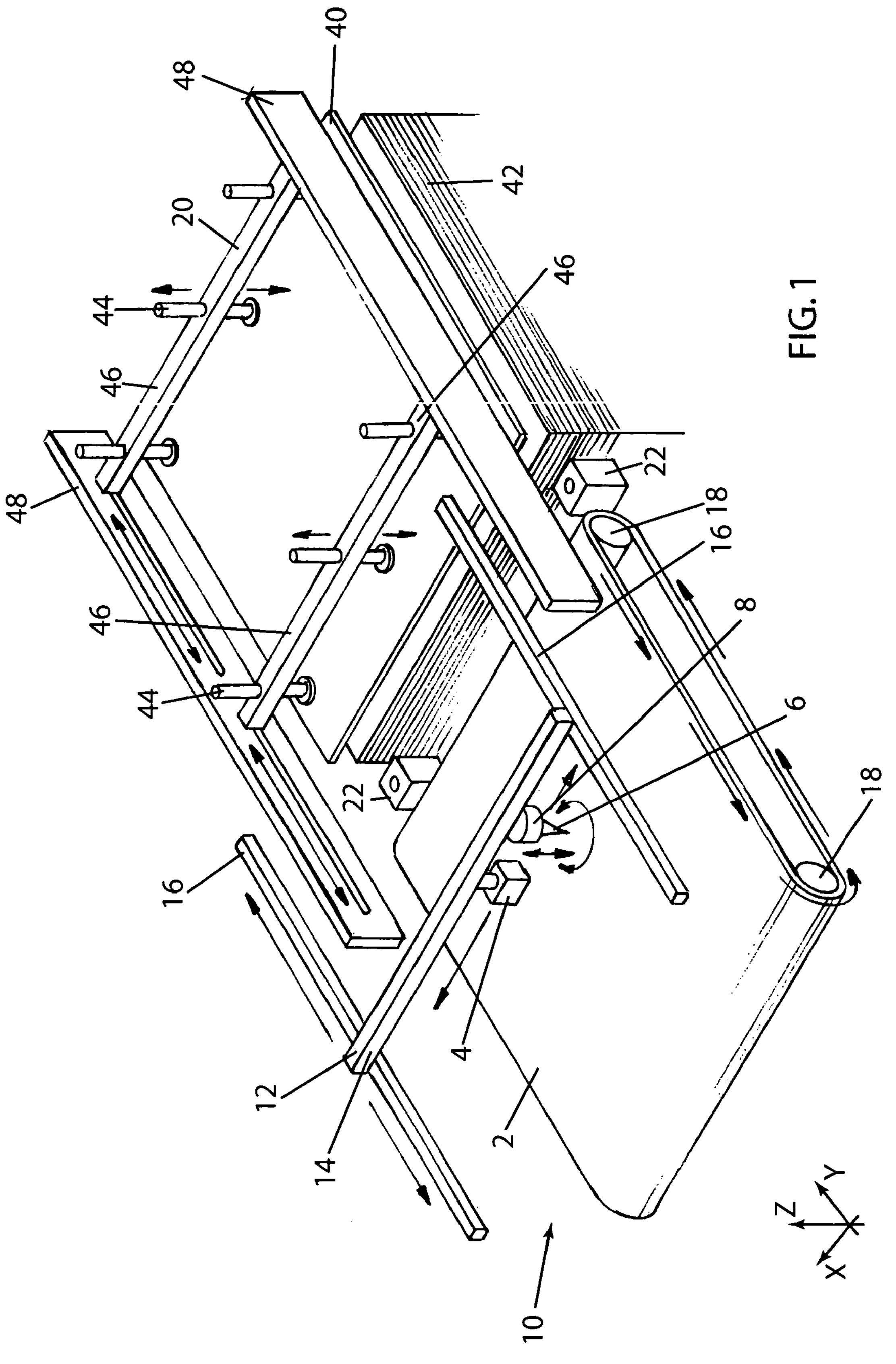
FIG. 1 is a perspective schematic view of the apparatus in accordance with the principles of an embodiment of the present invention.

FIG. 1 is a perspective schematic view of an apparatus 10 for performing finishing operations from the process side of a graphics sheet. Apparatus 10 is configured to perform finishing operations such as cutting and creasing on individual graphics sheets 40 shown in a stack 42 of sheets awaiting finishing operations.

Apparatus 10 has a sheet-receiving surface 2 which in FIG. 1 is a movable belt operating over a pair of rollers 18. Two rollers 18 enable sheet-receiving surface 2 to position a graphics sheet 40 along a longitudinal axis (Y-axis as indicated) for finishing operations and to move sheet 40 on and off sheet-receiving surface 2.

Apparatus 10 further includes a process-side sensor 4 which can be a CCD camera and a tool 6 mounted in a tool actuator 8. Both process-side sensor 4 and tool actuator 8 are mounted on an X-Y frame 12 consisting of a transverse frame member 14 and two longitudinal frame members 16. X-Y frame 12, process-side sensor 4, and tool actuator 8, together with sheet-receiving surface 2, are the basic elements of a device known in the art as a flatbed plotter or cutter and may be a Zund plotter, manufactured by Zund System Technik HG, or a Wild plotter, to give two non-limiting examples.

The movements of tool 6, process-side sensor 4, and sheet-receiving surface 2 are effected by actuators not detailed herein. Such details are known to those skilled in the art of flatbed plotter devices. Process-side sensor 4 and tool 6 are moved longitudinally by the movement of transverse frame member 14 along longitudinal frame members 16 (for Y-axis motion) and transversely by movement along frame member 14 (for X-axis motion). Tool 6 is moved up-and-down (for Z-axis motion) and around its Z-axis by tool actuator 8 (tool rotation).

Included in apparatus 10 is a sheet feeder 20 which picks up a single graphics sheet 40 from stack 42 using a set of vacuum pickups 44 (six shown). Pickups 44 are mounted on a transverse feeder frame member 46 which is able to move in a plane generally parallel to the plane of stack 42 and sheet-receiving surface 2. Pickups 44 are configured to move in a plane generally perpendicular to the plane of stack 42 (generally along the Z-axis) such that an individual graphics sheet 40 is lifted up from stack 42. Sheet feeder 20 includes two longitudinal feeder frame members 48 along which transverse feeder frame member 46 moves longitudinally (Y-axis movement). As above in the description of the flatbed plotter, the actuators and controller required to effect these motions are also known to those skilled in the art of flatbed plotter devices.

Rollers 18, longitudinal frame members 16, and longitudinal feeder frame members 48 are affixed to a frame (not shown) which allows the relative movements described above to occur as commanded by the controller. Also included in apparatus 10 shown in FIG. 1 is a graphics-side sensor set consisting of two graphics-side sensors 22 also affixed to the frame (not shown). As in the case of process-side sensor 4, graphics-side sensors 22 can be CCD cameras. Graphics-side sensors 22 are positioned such that the graphics side of sheet 40 (facing downward in FIG. 1) can be viewed as sheet 40 is lifted up from stack 42 and can also be viewed as necessary as sheet 40 is moved longitudinally from sheet feeder 20 to sheet-receiving surface 2.

Figure 2:
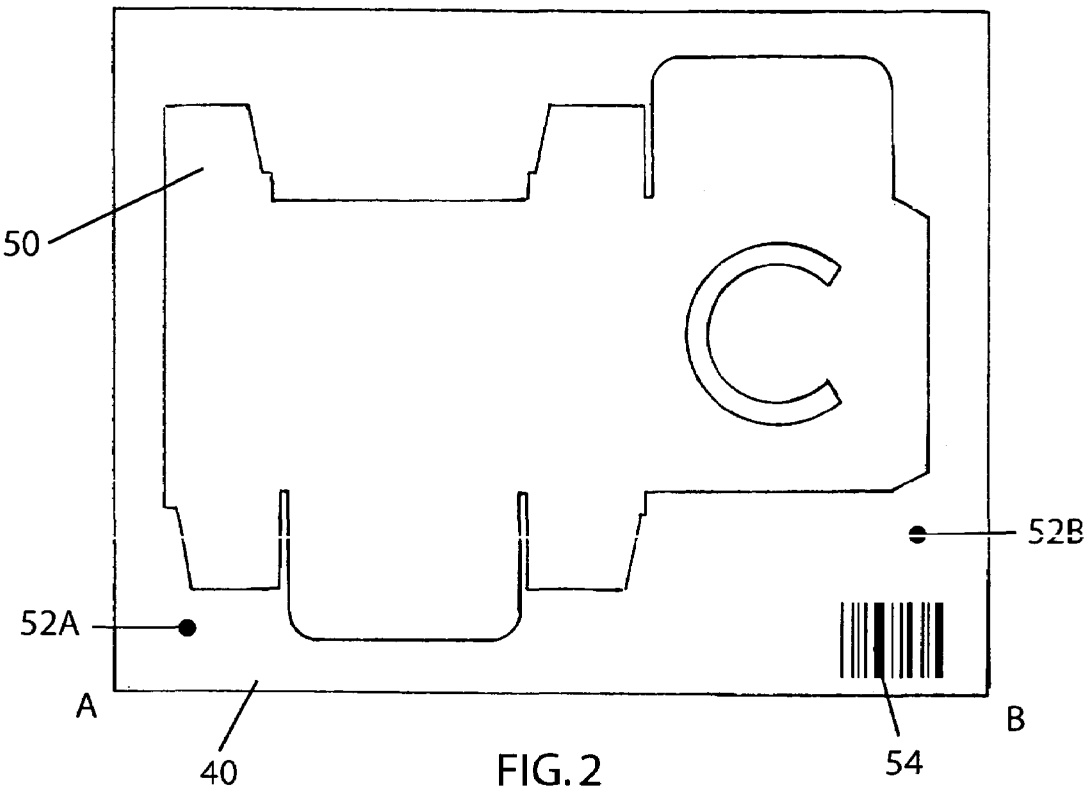
FIG. 2 is a view from the graphics side of a graphics sheet.

Referring now to FIG. 2, one example of graphics sheet 40 is shown as viewed from its graphics side, showing a printed graphics area 50. Two of the four corners of sheet 40 are labeled A and B, and both corner A and corner B have a single registration mark printed near each corner. These marks are designated by the numbers 52A and 52B, respectively. Marks 52A and 52B are printed at the same time as graphics area 50; thus the positions of marks 52A and 52B relative to graphics area 50 are known.

Referring again to FIG. 1, a representative operational cycle of apparatus 10 proceeds as follows. In this example, corners A and B are the reference features which are used to determine the position and orientation of sheet 40. Pickups 44 of sheet feeder 20 are lowered to pick up sheet 40 and are actuated to lift sheet 40. Transverse feeder frame members 46, carrying sheet 40, are moved longitudinally along longitudinal feeder frame members 48 toward sheet-receiving surface 2. As sheet 40 passes over graphics-side sensors 22, and as corners A and B of sheet 40 come into the field-of-view of graphics-side sensors 22, the metrics of corners A and B are sensed, and the positions of marks 52A and 52B are also sensed. All of this position information is gathered and stored by the controller (not shown).

Sheet feeder 20 then continues to move sheet 40 over sheet-receiving surface 2, and pickups 44 release sheet 40 onto sheet-receiving surface 2 which then pulls sheet 40 further along until sheet 40 is positioned completely on sheet-receiving surface 2. A vacuum system (not shown) is used to hold sheet 40 in place on sheet-receiving surface 2 during the remainder of the finishing operation cycle.

Figure 3:
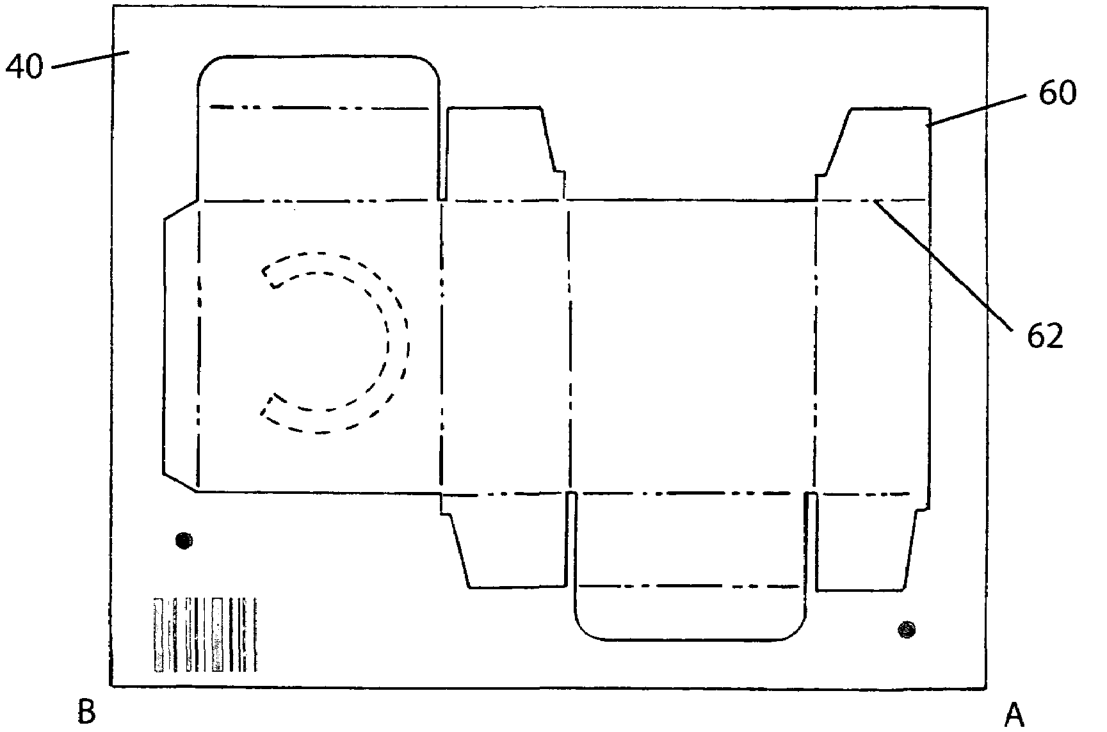
FIG. 3 is a view from the process side of the graphics sheet of FIG. 2 showing a representation of the graphics area as if viewable from the process side of the graphics sheet.

Sheet 40 is now positioned with its graphics side facing downward such that graphics area 50 and marks 52A and 52B are not visible from above the sheet; the process side of sheet 40 is facing upward. Process-side sensor 4 now is moved by X-Y plotter movement over corners A and B in order to sense the metrics of corners A and B and thus determine the position of corners A and B on sheet-receiving surface 2. Now, since the relative positions of marks 52A and 52B with respect to corners A and B are known from the measurements taken by graphics-side sensors 22, and since the relative position of graphics area 50 with respect to marks 52A and 52B is known, finishing operations can proceed with accuracy. FIG. 3 shows a process-side view of sheet 40 of FIG. 2 and depicts graphics area 50 as if it were viewable from the process side. In this example, an intermittent dotted line 62 is used to indicate fold lines to be creased, and a solid line 60 illustrates the line along which cutting will occur. Print registration errors (i.e., when the relative position of graphics area 50 and registration marks 52A and 52B have been printed at different position on sheet 40 than intended) can thus be compensated for during the finishing operations which now are carried out on sheet 40.

Note that this example, with only two corners and two registration marks sensed, represents the simplest form of compensation for errors in print registration. In such a case, the compensation which occurs assumes that graphics area 50 itself is not distorted along the Y-direction of sheet 40 but that the positions of marks 52A and 52B faithfully determine the position and orientation of graphics area 50 along the Y-direction with respect to entire sheet 40. Since marks 52A and 52B are spaced along the X-direction of sheet 40, in this case apparatus 10 can compensate for non-localized linear distortion along the X-direction of sheet 40. For some types of rigid and stable materials, such simple compensation may be adequate. However, for more complex situations in which sheet 40 has experienced non-linear or localized distortions, linear distortions in other directions, or other variations including those due to the sheet's absorption of humidity, more measurements must be taken. Such types of variations can result in both linear and non-linear distortions of the graphics area(s) printed on graphics sheets.

Figure 4:
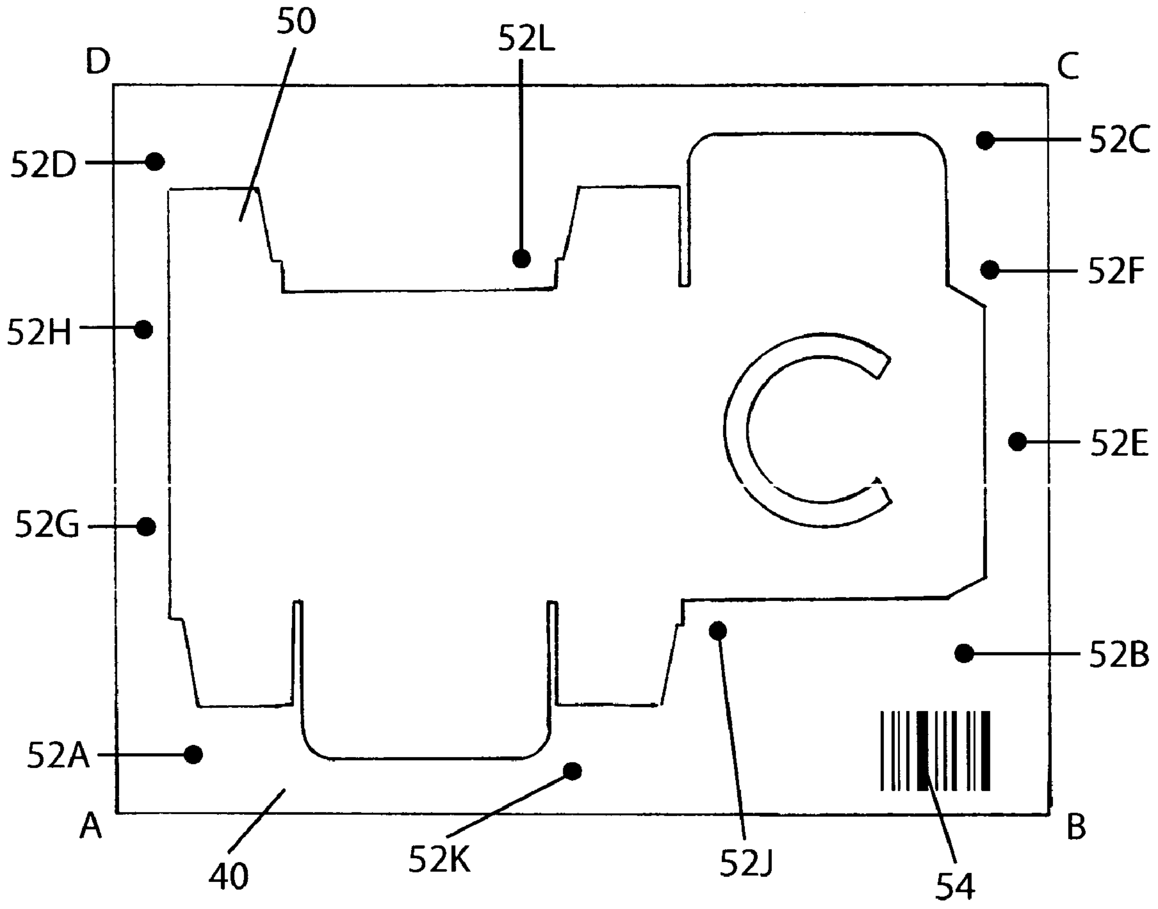
FIG. 4 is a view from the graphics side of a graphics sheet similar to that of FIG. 2 but with additional registration marks.

FIG. 4, showing graphics sheet 40 with a number of additional registration marks printed with graphics area 50, illustrates some situations in which other variations within graphics area 50, including both linear and non-linear distortion, are compensated for by the inventive method and apparatus. Three additional cases are described using FIG. 4.

In a first case, as sheet 40 is moved over graphics-side sensors 22, in addition to corners A and B, graphics-side sensors 22 are used to sense the metrics of the two other corners of sheet 40 (corners C and D) as well as the positions of the additional registration marks 52C and 52D. This additional sensing enables the apparatus 10 to compensate for linear distortions along Y-direction of sheet 40.

In a second case, in addition to the sensing described above, the positions of one or more additional registration marks between marks 52A and 52D (52G and/or 52H) and between 52B and 52C (52E and/or 52F) are also sensed. This additional sensing enables apparatus 10 to compensate for non-linear distortions along the Y-direction of sheet 40.

In third case, the positions of one or more additional registration marks from among the registration marks labeled 52J, 52K, and 52L are also sensed. This additional sensing enables apparatus 10 to compensate for non-linear distortions along the X-direction and with more accuracy across graphics area 50 than the previous cases.

Figure 5:
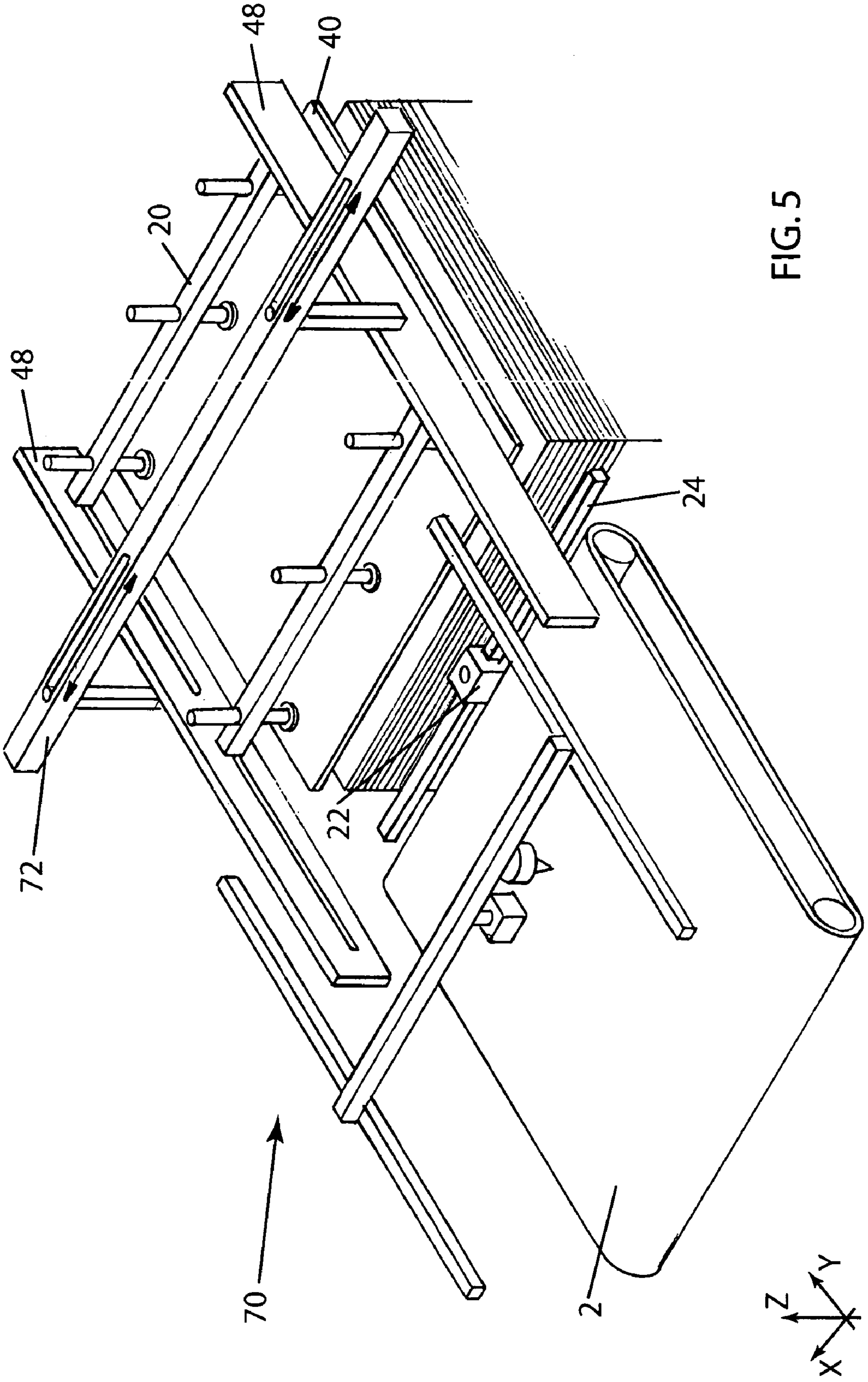
FIG. 5 is a perspective schematic view of the apparatus including a camera actuator and a sheet actuator in accordance with the principles of an embodiment of the present invention.

In order to sense the positions of registration marks 52J, 52K, and 52L which are positioned in FIG. 4 such that they would generally be outside of the field-of-view of graphics-side sensors 22 in apparatus 10 of FIG. 1, apparatus 70 is provided (FIG. 5). Apparatus 70 includes many of the same elements as apparatus 10. As shown in FIG. 5, apparatus 70 includes a graphics-side sensor set containing a single graphics-side sensor 22 mounted on a graphics sensor actuator 24 for translation of sensor 22 along the X-direction. Apparatus 70 also includes a sheet actuator 72 which is configured to translate sheet 40 along the X-direction. Instead of longitudinal feeder frame members 48 being affixed to an apparatus frame (not shown) as in apparatus 10, sheet actuator 72 of apparatus 70 is affixed to such a frame, leaving longitudinal feeder frame members 48 free to be moved by sheet actuator 72.

Using one or both of these actuators, sheet 40 is able to be positioned such that as sheet 40 is moved along the Y-direction, the position of registration marks 52J, 52K, and 52L along the X-direction can also be changed relative to graphics-side sensor 22 such that all registration marks can be brought into the field-of-view of sensor 22. Graphics sensor actuator 24 and sheet actuator 72 are controlled by the controller. Details of such actuators and the control thereof are well-known to those skilled in the art of flatbed plotters.

These three cases are by no means an exhaustive list of situations for which apparatus 10 or 70 is able to provide accurate finish-processing of graphics sheets but are simply illustrative of how to apply the inventive method and apparatus to various finishing operation situations. In general, increasing the number of measurements sensed by graphics-side sensors 22 over graphics sheet 40 leads to increased finish-processing accuracy.

Referring again to FIG. 2, a bar code 54 is printed near corner B of sheet 40. While bar code 54 is in the field-of-view of a sensor 22 in the graphics-side sensor set, bar code 54 is read in order to identify the particular graphics area printed on sheet 40. Associated with graphics area 50 is a set of finishing operation instructions which are used by the controller (not shown) to carry out the proper finishing operations on sheet 40. For example, if an unexpected graphics sheet (i.e., a graphics not bearing the particular graphics area which is expected by the controller due to, for instance, a loading error) is received on the sheet-receiving surface 2, the controller, having identified sheet 40, prevents the wrong finishing operations from being carried out on sheet 40.

When a number of different graphics areas are printed on the graphics sheets loaded into sheet feeder 20 and the corresponding sets of finishing operation instructions are loaded into the controller, each graphics sheet 40 can be identified by reading bar code 54 allowing apparatus 10 to select the proper instruction set by which to carry out the proper finishing operations on each of the different graphics sheets.

If desired, the controller of apparatus 10 can be configured to prevent finishing operations from being carried out on graphics sheets if the sheets have been loaded onto sheet-receiving surface 2 outside the region in which the operations can be carried out or if, for example, sheet 40 has been loaded into sheet feeder 20 in a wrong (unexpected) orientation.

Figure 6:
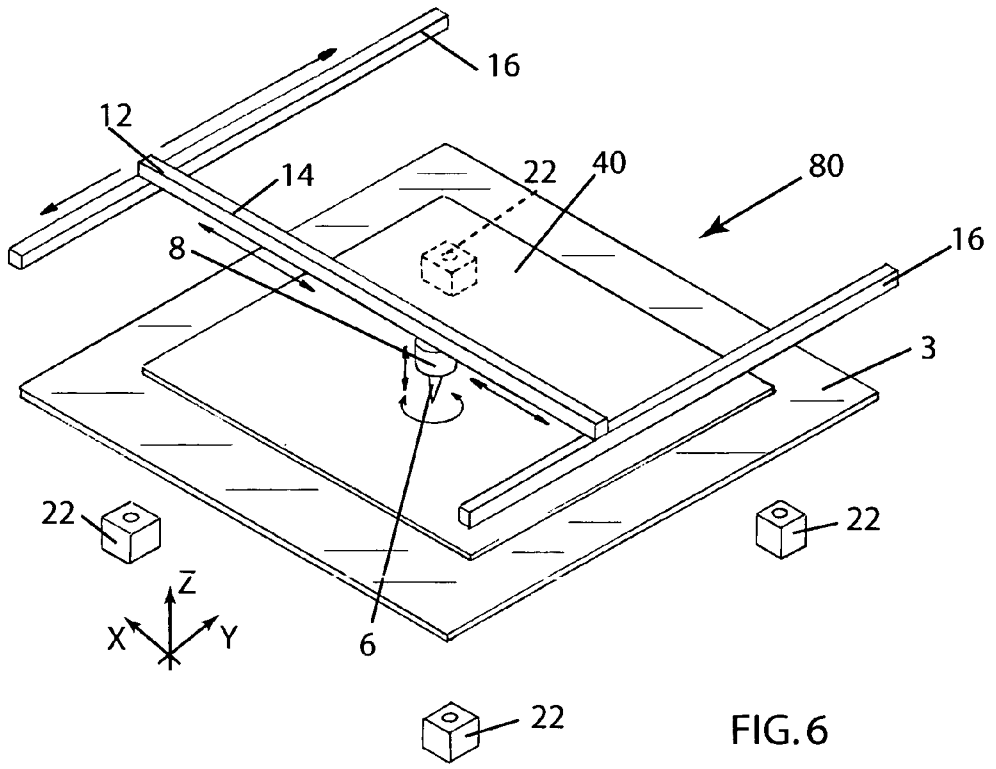
FIG. 6 is a perspective schematic view of the apparatus including a transparent sheet-receiving surface and a graphics-side sensor set comprising four fixed cameras in accordance with the principles of an embodiment of the present invention.

FIG. 6 illustrates another embodiment of the inventive apparatus, showing an apparatus 80 which includes a transparent sheet-receiving surface 3 and a graphics-side sensor set comprised of four fixed graphics-side sensors 22. A graphics sheet 40 is placed onto sheet-receiving surface 3 with the graphics side facing down. In the embodiment shown in FIG. 6, four graphics-side sensors 22 sense the metrics of reference features of sheet 40 and the registration marks located near each of the corners of sheet 40, for example as on the graphics side of sheet 40 in FIG. 2. Using this sensed information, apparatus 80, with a controller (not shown) compensates for variations in the print registration of the graphics area printed on sheet 40, in a fashion similar to apparatus 10 but without requiring use of a process-side sensor.

Figure 7:
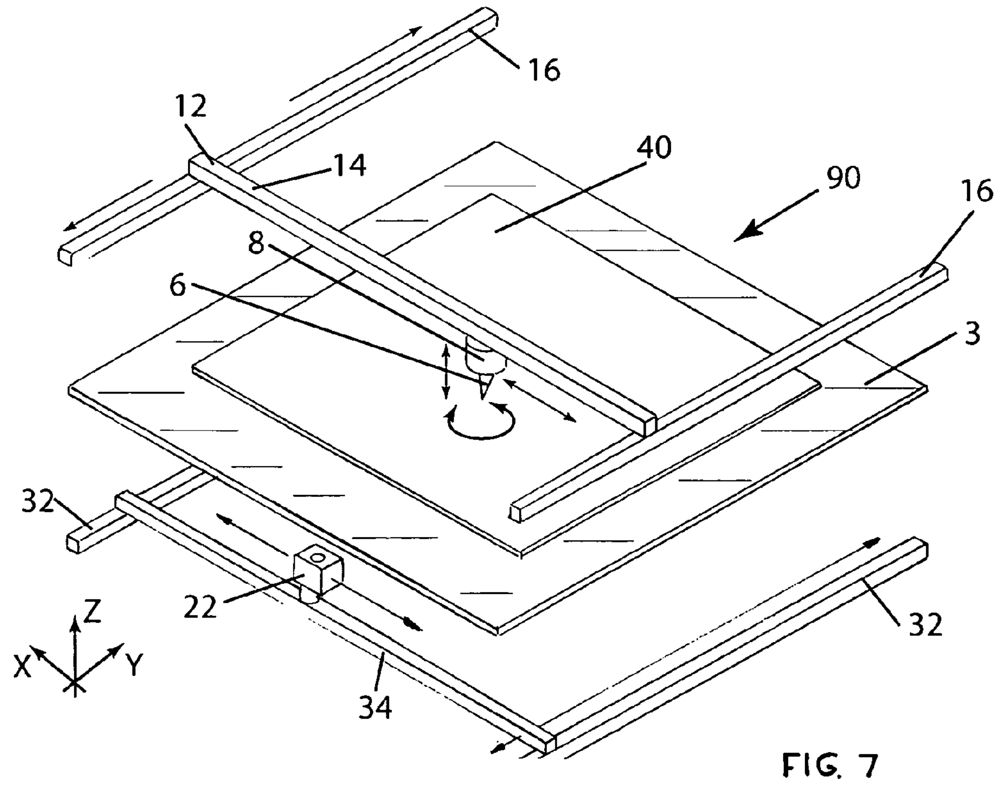
FIG. 7 is a perspective schematic view of the apparatus including a transparent sheet-receiving surface and a graphics-side sensor set comprising a translatable camera in accordance with the principles of an embodiment of the present invention.

FIG. 7 illustrates another embodiment of the inventive apparatus, showing an apparatus 90 which also includes transparent sheet-receiving surface 3 and a graphics-side sensor set, in this case comprised of a single graphics-side sensor 22. Graphics-side sensor 22 is movable in both the X-direction and the Y-direction, being driven by actuators (not shown) which drive a graphics-side sensor transverse frame member 34 and two graphics-side sensor longitudinal frame members 32, enabling graphics-side sensor 22 to view multiple regions of the graphics side of sheet 40 through transparent sheet-receiving surface 3. With sensor 22 able to sense the metrics of reference features and the positions of registration marks over a larger portion of sheet 40 as illustrated in FIG. 4 and described in the second and third cases above, apparatus 90 is able to compensate for variations in print registration and distortions in sheet 40 including both linear and non-linear distortions during processing as described above, again without use of a process-side sensor.

While the principles of this invention have been described in connection with specific embodiments, it should be understood clearly that these descriptions are made only by way of example and are not intended to limit the scope of the invention.

The invention claimed is:

1. A method for performing finishing operations on at least one graphics area on a graphics sheet, the graphics sheet having a graphics side, an opposite process side, and reference features, the graphics side bearing the graphics area(s) and registration marks placed in predetermined positions with respect to the graphics area(s), the method comprising:

- positioning the graphics sheet on a sheet-receiving surface;
- sensing from the graphics side the positions of the registration marks at the time of the finishing operations;
- determining from the sensed positions the coordinates of the graphics area(s) with respect to the sheet-receiving surface as if viewable from the process side; and
- performing finishing operations from the process side of the graphics sheet based on such determination, whereby such process-side finishing operations compensate for variations of the graphics area(s) at the time of the finishing operations.

2. The method of claim 1 wherein the variations include print registration errors, linear distortions, or non-linear distortions.

3. The method of claim 1 wherein the graphics sheet is positioned with the graphics side facing the sheet-receiving surface throughout the sensing, determining, and performing actions.

4. The method of claim 3 wherein a portion of the sheet-receiving surface is transparent and the positions of the registration marks are sensed through the transparent portion.

5. The method of claim 1 wherein the reference features have metrics and the method further comprises:

- sensing from the graphics side the metrics of the reference features of the sheet;
- sensing from the process side the metrics of the reference features; and
- using the relative positions of the registration marks to the reference features to determine the coordinates of the graphics area(s) with respect to the sheet-receiving surface.

6. The method of claim 5 wherein the metrics of the reference features and the positions of the registration marks are sensed from the graphics side before the graphics sheet is positioned on the sheet-receiving surface for performing the finishing operations.

7. The method of claim 6 wherein the metrics of the reference features and the positions of the registration marks are sensed from the graphics side during translation of the graphics sheet in a plane parallel to the graphics sheet.

8. The method of claim 5 wherein the sensing of the positions of the registration marks from the graphics side includes sensing the positions of the registration marks not adjacent to the reference features.

9. The method of claim 5 wherein the metrics of the reference features and the positions of the registration marks are sensed from the graphics side by translating a sensor in a plane parallel to the graphics sheet.

10. The method of claim 9 wherein the sensing of the positions of the registration marks from the graphics side includes sensing the positions of the registration marks not adjacent to the reference features.

11. The method of claim 5 wherein the sensing of the metrics of the reference features from the graphics side includes sensing the positions of at least two corners of the graphics sheet.

12. The method of claim 11 wherein the sensing of the positions of the registration marks from the graphics side includes sensing the position(s) of at least one registration mark adjacent to each of the at least two corners of the graphics sheet.

13. The method of claim 11 wherein the sensing from the process side of the metrics of the reference features includes sensing the positions of the at least two corners of the graphics sheet.

14. The method of claim 5 further comprising:

automatically identifying the graphics sheet; and selecting finishing operation instructions associated with the identified graphics sheet, thereby enabling graphics sheets printed with differing graphics areas to be automatically finished sequentially.

15. The method of claim 14 wherein the automatic identifying step includes reading a bar code on the graphics side of the graphics sheet.

16. The method of claim 5 further comprising determining whether the graphics sheet has been properly loaded to correspond to a set of finishing operation instructions and, if not, preventing the finishing operation from occurring.

17. An apparatus for performing finishing operations on at least one graphics area on a graphics sheet, the graphics sheet having a graphics side, an opposite process side, and reference features, the graphics side bearing the graphics area(s) and registration marks placed in predetermined positions with respect to the graphics area(s), the apparatus comprising:

a sheet-receiving surface;

a graphics-side sensor set for sensing from the graphics side the positions of the registration marks at the time of the finishing operations; and a controller for determining from the sensed positions the coordinates of the graphics area(s) with respect to the sheet-receiving surface as if viewable from the process side and for controlling finishing operations from the process side of the graphics sheet based on such determination, whereby such process-side finishing operations compensate for variations of the graphics area(s) at the time of the finishing operations.

18. The apparatus of claim 17 wherein the variations include print registration errors, linear distortions, or nonlinear distortions.

19. The apparatus of claim 17 wherein at least a portion of the sheet receiving surface is transparent and the graphics-side sensor set senses the positions of the registration marks through the transparent portion.

20. The apparatus of claim 17 wherein the reference features have metrics and the graphics-side sensor set senses from the graphics side the metrics of the reference features of the sheet, the apparatus further comprising a process-side sensor to sense the metrics of the reference features from the process side.

21. The apparatus of claim 17 wherein the graphics-side sensor set includes at least one camera.

22. The apparatus of claim 17 further including a sheet actuator to translate the graphics sheet in a plane parallel to the graphics sheet during sensing from the graphics side.

23. The apparatus of claim 17 further including lifting and holding apparatus to lift and hold the graphics sheet during the sensing from the graphics side.

* * * * *